(12) United States Patent
Khosravani

(10) Patent No.: US 11,879,488 B2
(45) Date of Patent: Jan. 23, 2024

(54) LIGHTNING DAMAGE RESISTANT ONE SIDED INSTALLATION

(71) Applicant: THE BOEING COMPANY, Chicago, IL (US)

(72) Inventor: Shahriar Khosravani, Everett, WA (US)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 16/741,363

(22) Filed: Jan. 13, 2020

(65) Prior Publication Data
US 2021/0215186 A1 Jul. 15, 2021

(51) Int. Cl.
| | |
|---|---|
| *F16B 31/02* | (2006.01) |
| *F16B 35/04* | (2006.01) |
| *F16B 35/06* | (2006.01) |
| *B64D 45/02* | (2006.01) |
| *F16B 33/00* | (2006.01) |
| *F16B 19/10* | (2006.01) |

(52) U.S. Cl.
CPC ............ *F16B 31/021* (2013.01); *B64D 45/02* (2013.01); *F16B 19/1054* (2013.01); *F16B 33/004* (2013.01); *F16B 35/041* (2013.01); *F16B 35/06* (2013.01)

(58) Field of Classification Search
CPC ....... F16B 35/06; F16B 35/041; F16B 31/021
See application file for complete search history.

(56) References Cited

U.S. PATENT DOCUMENTS

| | | |
|---|---|---|
| 9,593,706 B2 | 3/2017 | Bickford et al. |
| 9,669,942 B2 | 6/2017 | Khosravani et al. |
| 2010/0224086 A1* | 9/2010 | Scheinberger ...... F16B 19/1045 100/289 |

(Continued)

FOREIGN PATENT DOCUMENTS

| | | |
|---|---|---|
| EP | 2471712 A2 | 7/2012 |
| EP | 3078597 A1 | 10/2016 |

(Continued)

OTHER PUBLICATIONS

Written Opinion for EP Application No. 20216207.9 dated May 28, 2021.

(Continued)

*Primary Examiner* — Kyle A Cook
(74) *Attorney, Agent, or Firm* — Quinn IP Law

(57) ABSTRACT

A fastener assembly includes a bolt having a head and having a shank. The shank defines threads, the bolt defines a channel which extends circumferentially about the bolt, and the head defines multiple head channels with a first end of each of the multiple head channels in communication with the channel and a second end of each of the multiple head channels in communication with an outside of the head positioned at a top surface of the head. The fastener assembly further includes a sleeve having threads compatible for engaging the threads of the bolt. The sleeve includes a portion of the sleeve including an annealed material and multiple slots defined through the sleeve. With the bolt positioned within the sleeve, each of the multiple slots defined through the sleeve is positioned in communication with the channel.

20 Claims, 8 Drawing Sheets

(56) References Cited

U.S. PATENT DOCUMENTS

2014/0130335 A1* 5/2014 Bickford ............ F16B 19/1072
29/525.02
2014/0219744 A1 8/2014 Heeter et al.
2016/0229552 A1 8/2016 Gross et al.
2016/0297542 A1* 10/2016 Khosravani ............ B64D 45/02

FOREIGN PATENT DOCUMENTS

EP 3584289 A1 12/2019
WO WO-2007100906 A2 9/2007

OTHER PUBLICATIONS

European Search Report for EP Application No. 20216207.9 dated May 28, 2021.

* cited by examiner

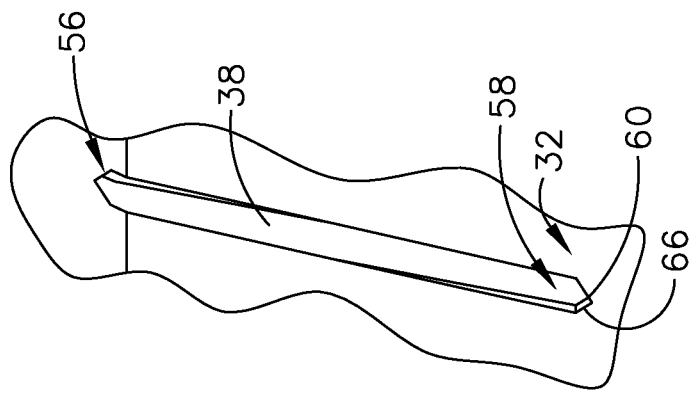
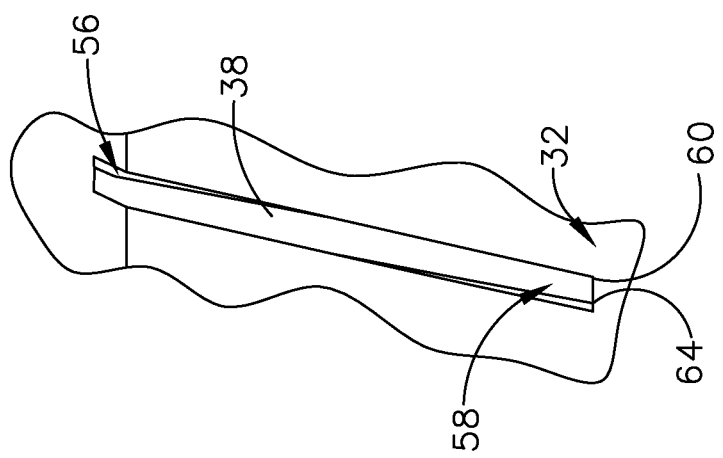
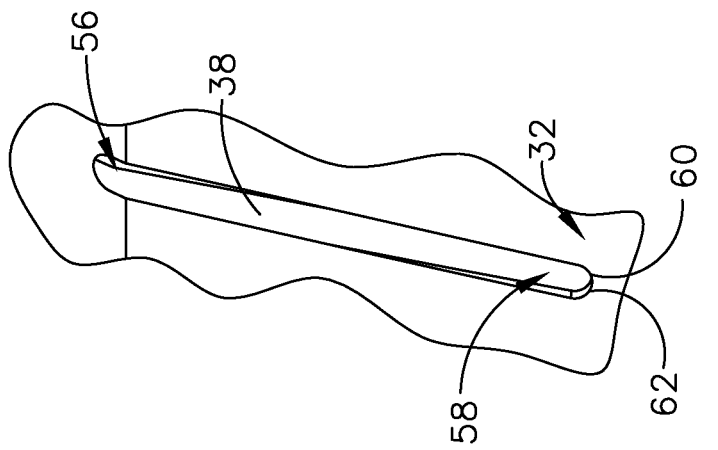

84

86

POSITIONING A BOLT, HAVING A HEAD AND HAVING A SHANK, INTO A SLEEVE, WHEREIN:
THE SHANK DEFINES THREADS; THE BOLT DEFINES A CHANNEL WHICH EXTENDS CIRCUMFERENTIALLY ABOUT THE BOLT; THE HEAD DEFINES MULTIPLE HEAD CHANNELS, A FIRST END OF EACH OF THE MULTIPLE HEAD CHANNELS IS IN COMMUNICATION WITH THE CHANNEL AND A SECOND END OF EACH OF THE MULTIPLE HEAD CHANNELS IS IN COMMUNICATION WITH AN OUTSIDE OF THE HEAD POSITIONED AT A TOP SURFACE OF THE HEAD; AND THE SLEEVE HAS THREADS COMPATIBLE FOR ENGAGING THE THREADS OF THE BOLT, WHEREIN THE SLEEVE WHICH INCLUDES A PORTION OF THE SLEEVE COMPRISING AN ANNEALED MATERIAL; AND MULTIPLE SLOTS ARE DEFINED THROUGH THE SLEEVE, SUCH THAT WITH THE BOLT POSITIONED WITHIN THE SLEEVE, EACH OF THE MULTIPLE SLOTS IS POSITIONED IN COMMUNICATION WITH THE CHANNEL.

FIG. 8

LIGHTNING DAMAGE RESISTANT ONE SIDED INSTALLATION

FIELD

The present disclosure relates to a one sided structural fastener and more particularly to a one sided structural fastener which provides resistance to an occurrence of internal structural damage to an aircraft from electromagnetic effect (EME) of a lightning strike.

BACKGROUND

In constructing particular structures such as an aircraft, fasteners are employed from an exterior of a skin of the aircraft, with the fastener extending through the skin and into an interior of the aircraft, wherein the fastener is typically secured on the interior side of the skin. Certain locations of the exterior of the skin of the aircraft have corresponding internal side of the skin associated with internal space, which is small and confined, making such internal space of the aircraft difficult to access and likewise difficult to access the fastener to be secured. This is particularly common in constructing a smaller aircraft and in particular with respect to constructing a wing of the smaller aircraft. As a result, one sided installation from an exterior of the skin of the aircraft is a desirable technique in installing such fasteners.

In an example of constructing a wing on a small aircraft, which contains a fuel tank, installation of fasteners are particularly challenging with respect to being able to fully satisfy the electromagnetic effect (EME) requirements. The small and confined space within the wing restricts the fabricator from being able to have access to the fastener on the interior side of the skin in order to apply a sealant or a sealant with a cap system for covering the fastener and isolating the fastener positioned extending from an interior side of the skin of the aircraft and any gaps that may be present between the fastener and the skin. As a result, there is a need to provide a fastener assembly which provides one sided installation and which can also protect the interior of the aircraft from damage from an EME such as from a lightning strike to the aircraft without access to the interior side of the skin through which the fastener extends.

Theoretically, EME's of a lightning strike on an aircraft are limited by a theoretically continuous, electro-conductive exterior skin of the aircraft in a manner of a so called "Faraday cage" such that the interior of the aircraft would be relatively unaffected by the lightning strike. However, as a practical matter, the skin of the aircraft is actually discontinuous in being pierced, for example, by a relatively large number of typically electro-conductive fasteners.

Because of the penetrating discontinuities that the fasteners introduce into the skin, some lightning strikes can produce a high-energy electrical arc at the interface between a fastener and the surrounding aircraft skin, which results in the production of superheated gases and superheated combustion particles between the interface of the fastener and the skin along with elevated pressures. Without effectively blocking or safely venting to the atmosphere, the superheated gas and superheated combustion particles can penetrate along the interface between the fastener and the skin and into interior spaces within the aircraft causing unwanted damage in the aircraft in areas of the aircraft particularly sensitive to EME. The EME from a lightning strike can occur with respect to a metal skin or a composite skin.

There is a need to provide one sided installation of fasteners from the exterior of the skin of an aircraft for aircraft and in particular smaller aircraft which have an interior side of the skin, at the location of installation of the fasteners, associated with a small and confined interior space. At the same time, there is a need to provide protection to the interior of the aircraft at these small and confined space locations from EME damage such as caused by lightning strikes on the aircraft.

SUMMARY

An example includes a fastener assembly which includes a bolt having a head and having a shank. The shank defines threads, the bolt defines a channel which extends circumferentially about the bolt, and the head defines multiple head channels with a first end of each of the multiple head channels in communication with the channel and a second end of each of the multiple head channels in communication with an outside of the head positioned at a top surface of the head. The fastener assembly further includes a sleeve having threads compatible for engaging the threads of the bolt. The sleeve includes a portion of the sleeve which includes an annealed material and multiple slots defined through the sleeve. With the bolt positioned within the sleeve, each of the multiple slots defined through the sleeve is positioned in communication with the channel.

An example includes a method for installing a fastener assembly, which includes positioning a bolt, having a head and having a shank, into a sleeve. The shank defines threads, the bolt defines a channel which extends circumferentially about the bolt, the head defines multiple head channels, and a first end of each of the multiple head channels is in communication with the channel and a second end of each of the head channels is in communication with an outside of the head positioned at a top surface of the head. The sleeve has threads compatible for engaging the threads of the bolt. A portion of the sleeve includes an annealed material and multiple slots are defined through the sleeve, such that with the bolt positioned within the sleeve, each of the multiple slots is positioned in communication with the channel.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 7A-7C each includes an isolated perspective view of a different end configuration for a slot positioned within the collapsible sleeve of the bolt assembly as seen in FIGS. 1 and 2; and FIG. 8 is a flow chart for installing the fastener assembly into a layered structure.

DESCRIPTION

Figure 1:
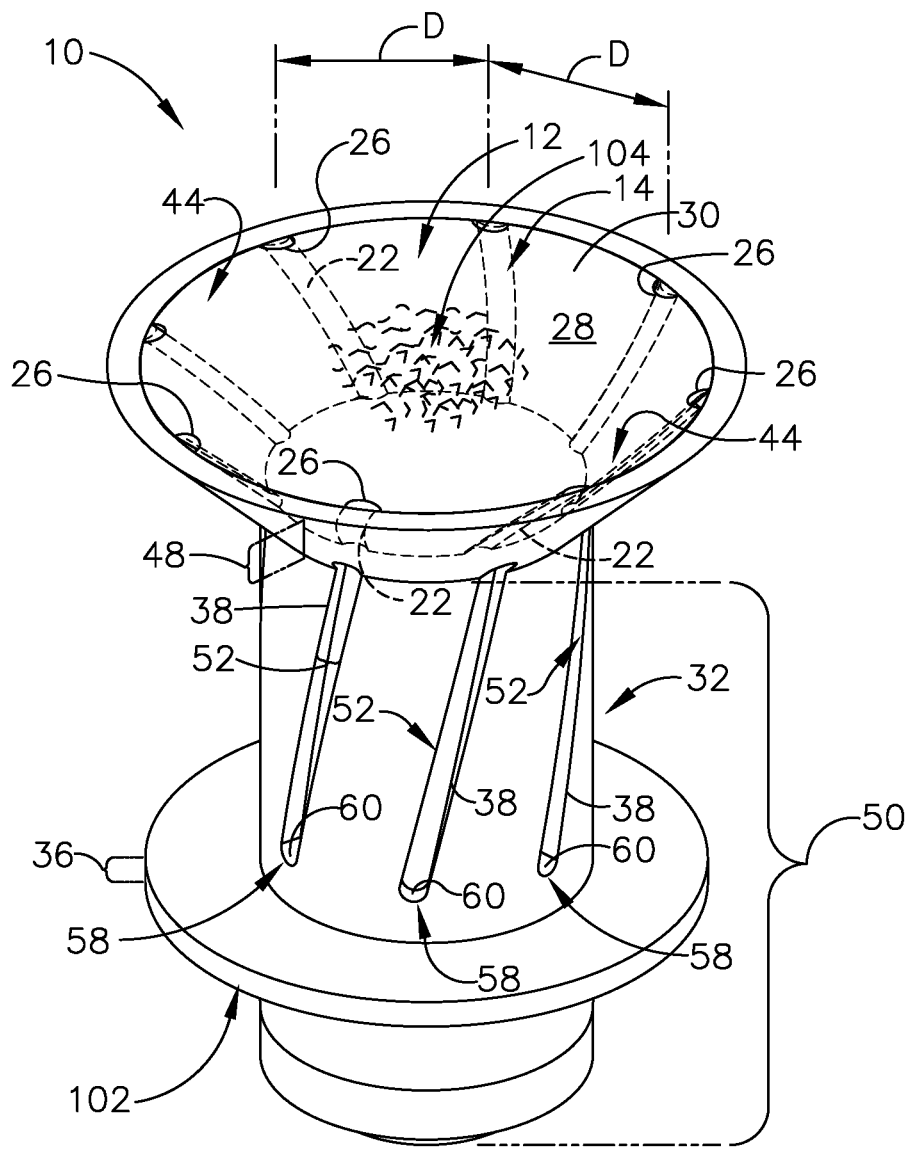
FIG. 1 perspective isolated view of a fastener assembly in an installed configuration, which includes a threaded bolt and a collapsible sleeve.
Figure 2:
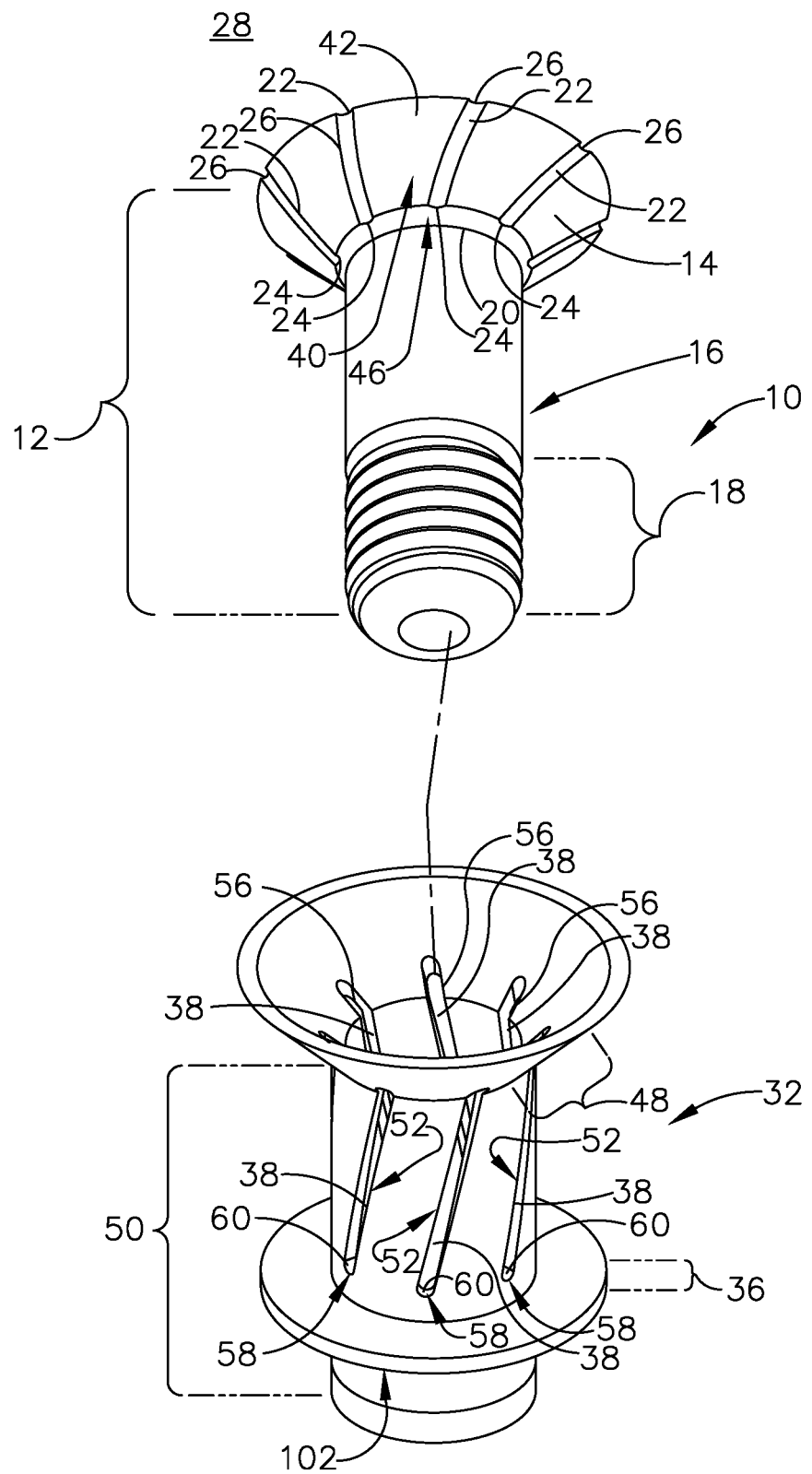
FIG. 2 is an exploded view of the fastener assembly of FIG. 1.
Figure 3:
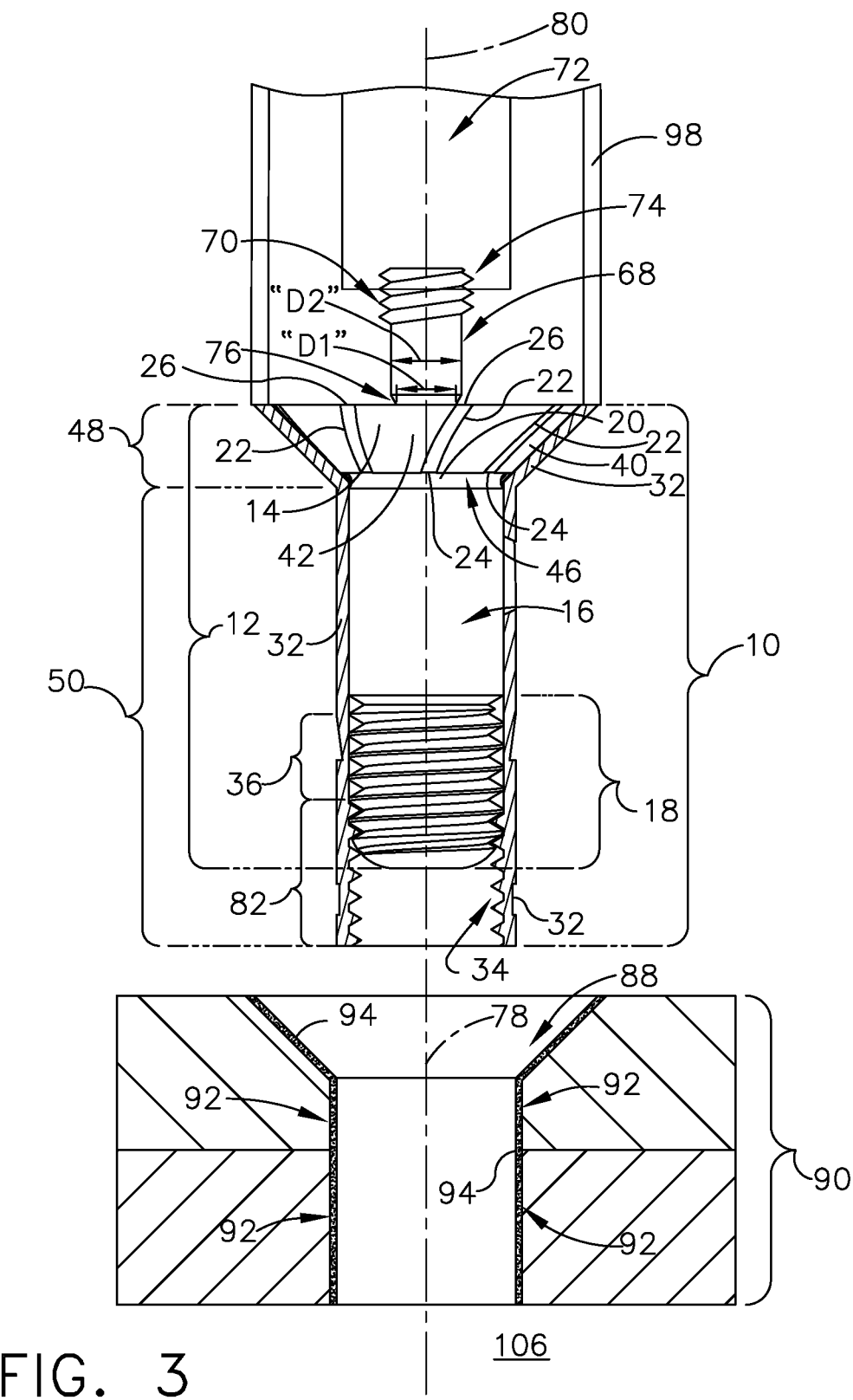
FIG. 3 is a partial cross section (threads of bolt not in cross section) view of the fastener assembly being installed with a securement mechanism aligning the fastener assembly to be inserted into an opening defined by a layered structure to be secured by the bolt assembly.
Figure 4:
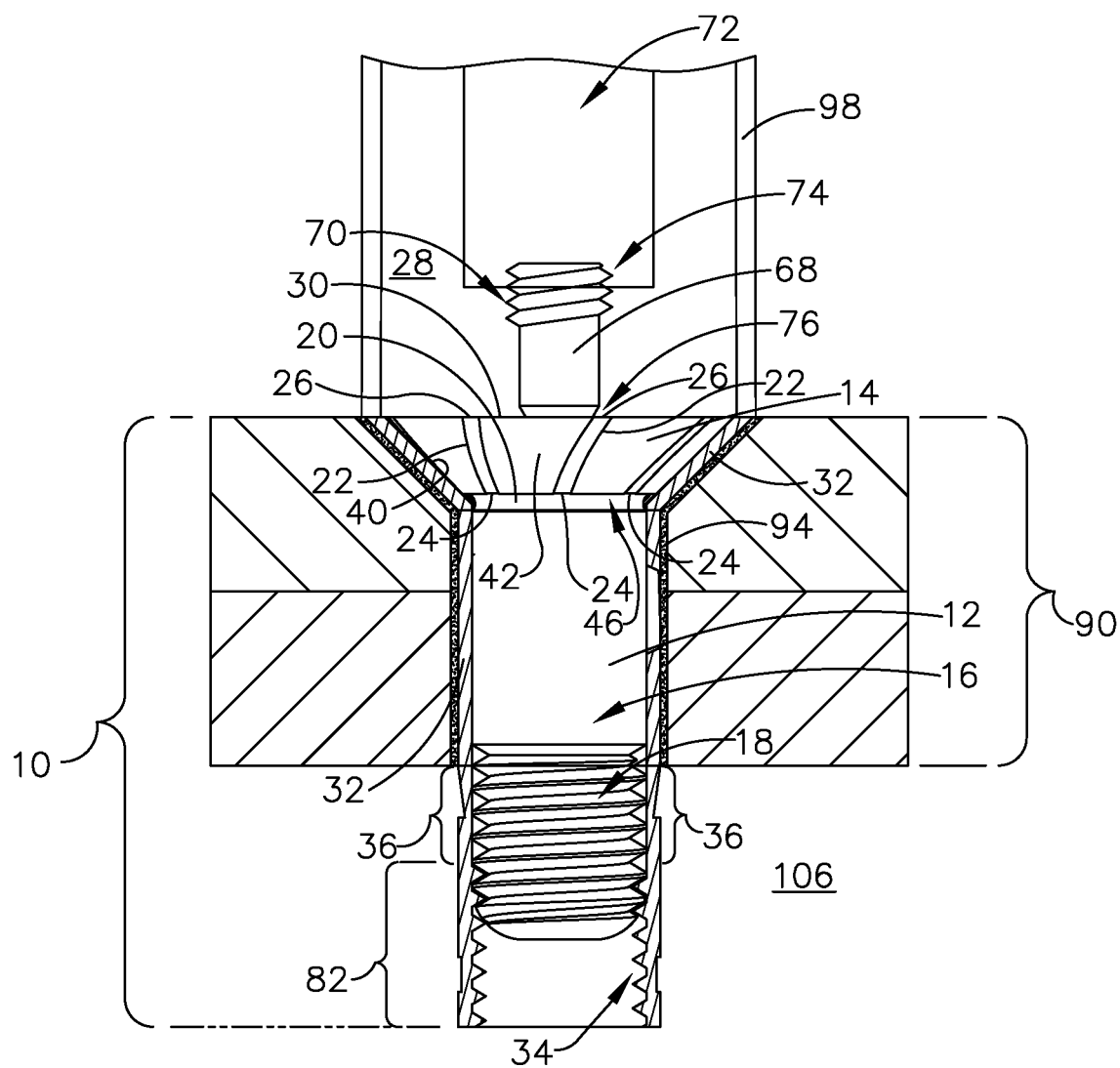
FIG. 4 is the view of FIG. 3 wherein the fastener assembly has been inserted into the opening of the layered structure.

In referring to FIGS. 1-3, fastener assembly 10, is typically constructed of a metal material. As seen in FIG. 3, fastener assembly 10 includes bolt 12 having head 14 and having shank 16. Shank 16 defines threads 18. Bolt 12 defines channel 20 which extends circumferentially about bolt 12. Head 14 defines multiple head channels 22 with first end 24 of each of multiple head channels 22 in communication with channel 20 and second end 26 of each of multiple head channels 22 in communication with an outside 28 of head 14 positioned at top surface 30 of head 14. In communication provides for a gas and/or particle to be able to pass from one structure to another structure or to another location outside of the one structure. Fastener assembly 10 further includes sleeve 32 having threads 34 compatible for engaging threads 18 of bolt 12. Portion 36 of sleeve 32 includes an annealed material. In this example, portion 36 of sleeve 32 was placed through an annealing process, exclusive of the remainder of sleeve 32, softening the metallic material of portion 36. Sleeve 32 includes multiple slots 38 defined through sleeve 32. With bolt 12 positioned within sleeve 32, each of multiple slots 38 defined through sleeve 32 is positioned in communication with channel 20.

In referring to FIGS. 2-6, head 14 of bolt 12 has a tapered configuration 40 and includes multiple head channels 22 which extend along external surface 42 of head 14. Multiple head channels 22 are spaced in this example equal distance "D" from adjacent head channels 22 as seen in FIG. 2 and extend to peripheral portion 44 of head 14 as seen in FIG. 1. First end 24 of each of multiple head channels 22 are positioned in communication with channel 20, as seen in FIG. 2, which is positioned at an interface 46 of head 14 and shank 16 of bolt 12.

With bolt 12 positioned within sleeve 32, sleeve 32 includes first portion 48, as seen in FIGS. 1-3, which extends circumferentially about head 14 in overlying relationship to multiple head channels 22 as seen in FIG. 1. Second portion 50 of sleeve 32 extends from first portion 48 and extends circumferentially about shank 16 of bolt 12. Each of multiple slots 38 extend in a curvilinear direction 52 along second portion 50 of sleeve 32. First end portion 56 of each of multiple slots 38 is in communication with channel 20 as shown in FIG. 2. Second end portion 58 of each of multiple slots 38 has a closed wall configuration 60, as seen in FIGS. 1 and 2. Variations of closed wall configuration 60 can be seen in FIGS. 7A-7C. In FIG. 7A closed wall configuration 60 has a "U" shape 62. In FIG. 7B closed wall configuration 60 has an open rectangular shape 64. In FIG. 7C closed wall configuration 60 has "V" shape 66. The closed configurations 60 as will be discussed blocks pressurized superheated gas and combustible particles positioned between bolt 12 and material, which bolt 12 secures, from reaching an interior of an aircraft upon an EME event such as a lightning strike.

Figure 5:
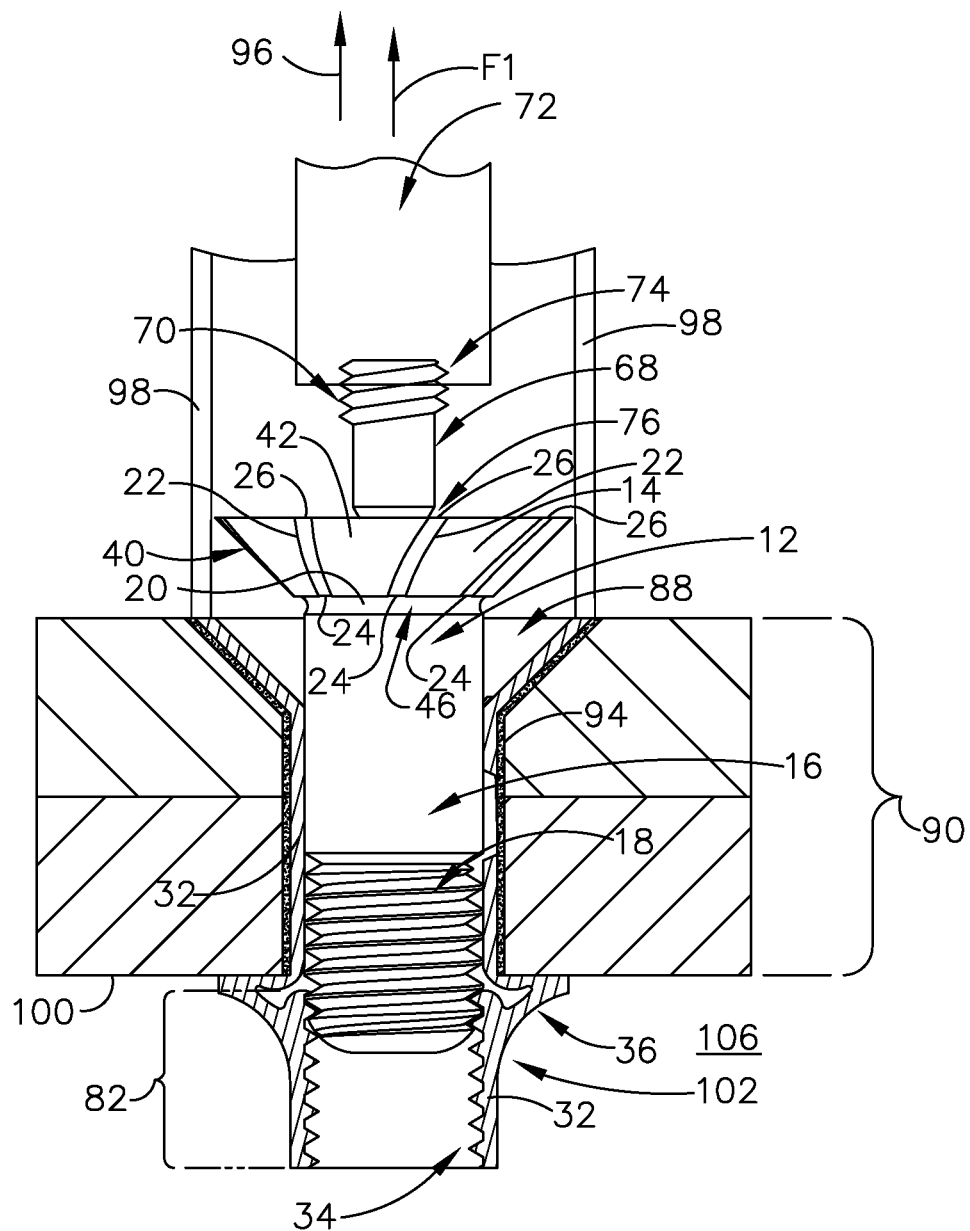
FIG. 5 is the view of FIG. 4, wherein the threaded bolt of the fastener assembly has been partially removed from the opening causing a portion of the collapsible sleeve to collapse providing a nut formation on an opposing side of the layered structure from the head of the threaded bolt.
Figure 6:
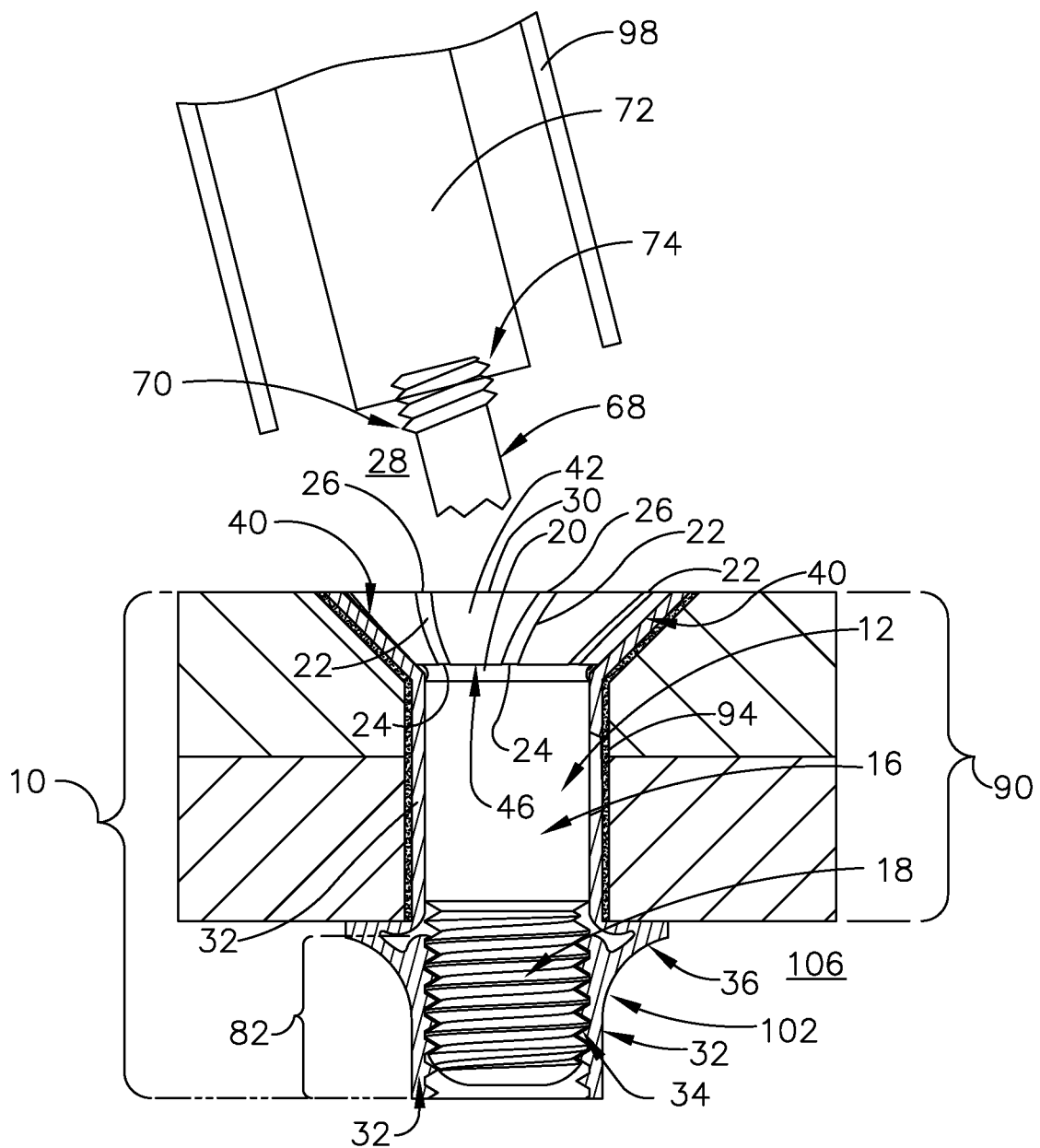
FIG. 6 is the view of FIG. 5, wherein the securement mechanism has torqued the threaded bolt in securement with the threads of the collapsible sleeve reaching a predetermined torque limit such that the fragile portion of the threaded bolt has broken away from the head of the threaded bolt.

Head 14 of bolt 12 includes frangible pintail 68 which is secured to and extends from head 14. Frangible pintail 68 defines pintail threads 70 which engages securement tool 72 having compatible threaded opening 74 to pintail threads 70, such that securement tool 72 can apply a pulling force F1 to bolt 12 as seen in FIG. 5 and can apply a torque to head 14 to insert bolt 12 into sleeve 32 up to a predetermined torque. The predetermined torque applied to frangible pintail 68 permits bolt 12 to be secured within sleeve 32 and applying a sufficient compressive force in securement of the material being secured by fastener assembly 10. Once the predetermined torque is attained, frangible pintail 68 breaks as seen in FIG. 6. The fracture of frangible pintail 68 occurs at a location where frangible pintail 68 has an interface 76 with head 14 as seen in FIG. 3 where interface 76, in this example, includes a smaller diameter "D1" than diameter "D2" of frangible pintail 68. Central axis 78 of bolt 12 and central axis 80 of frangible pintail 68, as seen in FIG. 3, are collinear providing for aligned pulling on bolt 12 and aligned application of torque applied to bolt 12 with respect to securing bolt 12, as will be discussed.

Sleeve 32 has portion 36 of annealed material which provides portion 36 softer construction relative to the remainder of sleeve 32. With bolt 12 positioned within sleeve 32, portion 36 is positioned between head 14 of bolt 12 and a non-annealed portion 82 of sleeve 32, as seen in FIGS. 5 and 6, which includes threads 34 compatible for engaging threads of bolt 12.

Fastener assembly 10 as seen in FIGS. 1-6 and in an installed configuration or position as seen respectively in FIGS. 1 and 6, provides for one sided installment. In addition, fastener assembly 10 prevents superheated gas and superheated combustible particles under pressure from entering an interior of an aircraft. Upon an EME event such as a lightning strike which generates a high energy location between bolt 12 and the material, such as a skin of the aircraft, to which fastener assembly 10 secures, pressurized superheated gas and combustible particles from the skin enter into multiple slots 38. Closed wall configuration 60 in each of multiple slots 38 block the pressurized superheated gas and combustible particles from moving into an interior 106 of the aircraft. The superheated gas and particles move away from closed wall configuration 60 along multiple slots 38 and enter channel 20. Channel 20 permits the pressurized superheated gas and combustible particles to reach multiple head channels 22 and move out of second end 26 of multiple head channels 22 and enter outside 28 of top surface 30 of head 14 which is positioned outside of the aircraft. With one sided installing of fastener assembly 10, interior of aircraft is protective from the superheated gases and combustible particles.

In referring to FIG. 8 method 84 for installing a fastener assembly 10, is shown including positioning 86 bolt 12, having head 14 and having shank 16, into sleeve 32. Shank 16 defines threads 18 and bolt 12 defines channel 20 which extends circumferentially about bolt 12. Head 14 defines multiple head channels 22 in which first end 24 of each of the multiple head channels 22 is in communication with channel 20 and second end 26 of each of head channels 22 is in communication with outside 28 of head 14 positioned at top surface 30 of head 14. Sleeve 32 has threads 34 compatible for engaging threads 18 of shank 16 of bolt 12. Sleeve 32 includes portion 36 of sleeve 32 including annealed material. Sleeve 32 also includes multiple slots 38, which are defined through sleeve 32, such that with bolt 12 positioned within sleeve 32, each of the multiple slots 38 are positioned in communication with channel 20.

Method 84 further including engaging threads 18 of bolt 12 with threads 34 of sleeve, as seen in FIG. 3, wherein threads 34 of sleeve 32 are positioned further from head 14 of bolt 12 than portion 36 of sleeve 32 having annealed material. Method 84 further including inserting bolt 12 and sleeve 32 into hole 88, as seen in FIG. 3, defined by layered structures 90 to be secured by fastener assembly 10. In this example, prior to insertion of fastener assembly 10 into hole 88, surface 92 of layered structures 90 are coated with a conductive coating 94 such as for example a gallium alloy which conforms to surface 92 of layered structures and which closes gaps between layered structures 90, which can include metal or composite material, and conductive metal or fibers of a composite layer(s) of layered structures 90 and bolt 12.

Method 84 further includes pulling bolt 12, as seen in FIG. 5, in direction 96 away from hole 88 while sleeve 32 is held within hole 88, causing portion 36 of the annealed material of sleeve 32 to buckle. Sleeve 32 is held in position with retainer 98 which remains in contact with head 14 of bolt 12, while securement tool 72 engaged to frangible pintail 68, secured to head 14, pulls bolt 12 away in direction 96 from hole 88. The pulling force F1 has threads 18 of bolt 12 pull on threads 34 of sleeve 32, which are positioned below portion 36 of sleeve 32 having annealed material such that the annealed material now collapses and spreads on bottom surface 100 of layered structure 90 forming a nut formation 102 in an interior 106 in this example of an aircraft.

With the pulling of bolt 12 to a desired position, pulling force F1 is stopped. At that point, method 84 further includes turning bolt 12, as is done in FIG. 6, with securement tool 72, which in turn, turns frangible pintail 68, which is connected to head 14 of bolt 12. Turning of frangible pintail 68 turns bolt 12, with retainer member 98 holding sleeve 32 from rotation such that threads 18 of bolt 12 further engage threads 34 of sleeve 32 positioned further away from portion 36 of the annealed material of sleeve 32 with respect to head 14 of bolt 12. The turning of bolt 12 applies a compression force onto layered structures 90 which define hole 88. Securement tool 72 continues to apply torque to frangible pintail 68 until a predetermined torque is attained. The predetermined torque is built into the construction of the interface between frangible pintail 68 and head 14 of bolt 12. Such that in this example, diameter "D1", of interface 76 between frangible pintail 68 and head 14, of material of frangible pintail 68 fails and fractures, as seen in FIG. 6. At the time of fracture of frangible pintail 68, frangible pintail 68 leaves fractured remains 104, as seen in FIG. 1, on head 14 of installed bolt 12 and disengages from head 14.

At this point, fastener assembly 10 has provided a one sided securement of layered structure 90 with a compression force applied between head 14 and nut formation 102 of annealed material of portion 36 of sleeve 32. The one sided securement has attained a desired predetermined torque securement. In addition, with multiple slots 38 positioned along sleeve 32, any high energy event as a result of an EME such as a lightning strike occurs which generates any superheated gas and particles under pressure positioned at a location of multiple slots 38, such pressurized superheated gas and combustible particles will be blocked by closed wall configuration 60 of multiple slots 38 from reaching, for example, bottom surface 100 of layered structures 90 and thereby blocked from reaching an interior of the aircraft. The superheated gas and combustible particles will travel within multiple slots 38 to channel 20, which circumferentially extends about bolt 12 and will exit through top surface of head 14 through multiple head channels 22. In this example with fastener assembly 10 being secured from an outside skin of the aircraft the superheated gas and superheated combustible particles exit the aircraft to outside 28 which is positioned in this example on an outside of the aircraft. As a result, one sided installations of fastener assemblies are accomplished with at the same time providing an interior of the aircraft protection from receiving unwanted pressurized superheated gas and superheated combustible particles.

While various embodiments have been described above, this disclosure is not intended to be limited thereto. Variations can be made to the disclosed embodiments that are still within the scope of the appended claims.

What is claimed:

1. A fastener assembly comprising:
a bolt having a head and a shank, wherein:
the shank defines threads;
the bolt defines a channel which extends circumferentially about the bolt; and
the head defines multiple head channels each having a first end in communication with the channel and a second end in communication with an outside of the head positioned at a top surface of the head; and
a sleeve including an outer surface and an inner surface opposing the outer surface, and wherein the inner surface has threads engaging the threads of the bolt when the bolt is positioned inside of the sleeve, wherein the sleeve includes:
a first portion and a second portion that extends from the first portion;
a portion of the sleeve formed of an annealed material to define an annealed portion;
multiple slots defined through the sleeve, and the annealed portion of the sleeve is disposed between the multiple slots and the threads of the sleeve;
each of the multiple slots defined through the sleeve is positioned in communication with the channel of the bolt when the bolt is positioned inside of the sleeve; and
each of the multiple slots extend in a curvilinear direction along the second portion of the sleeve between a first end portion and a second end portion of each respective ones of the multiple slots, wherein the first end portion of each of the multiple slots is disposed proximal to the first portion of the sleeve and the second end portion of each of the respective multiple slots is disposed proximal to the annealed portion of the sleeve, wherein the second end portion of each of the multiple slots is disposed forward of the corresponding first end portion of respective ones of the multiple slots relative to a clockwise direction around a central axis when viewing the sleeve from a top plan orientation, and wherein a configuration of the multiple slots is maintained when a torque is applied to the sleeve in response to clockwise rotation of the bolt relative to the central axis.

2. The fastener assembly of claim 1, wherein the multiple head channels extend along an external surface of the head.

3. The fastener assembly of claim 1, wherein the multiple head channels are spaced an equal distance from adjacent head channels.

4. The fastener assembly of claim 1, wherein the multiple head channels extend to a peripheral portion of the head.

5. The fastener assembly of claim 1, wherein the channel is positioned at an interface of the head and the shank of the bolt.

6. The fastener assembly of claim 1, wherein:
the sleeve includes a non-annealed portion disposed along the sleeve having the threads;
the annealed portion of the sleeve is positioned between the head of the bolt and the non-annealed portion of the sleeve when the bolt positioned inside of the sleeve; and
the portion of the sleeve collapses and spreads out to form a nut when a force is applied to the portion of the sleeve.

7. The fastener assembly of claim 1 wherein:
the outer surface of the sleeve defines a recess that extends inwardly toward the inner surface such that the sleeve presents a tapered portion that slopes inwardly toward the inner surface; and
the tapered portion is disposed along the annealed portion of the sleeve.

8. The fastener assembly of claim 1, wherein the first portion extends circumferentially about the head in overlying relationship to the multiple head channels when the bolt is positioned inside of the sleeve.

9. The fastener assembly of claim 8, wherein:
the first end portion of each of the multiple slots is in communication with the channel when the bolt is positioned inside of the sleeve;
the second end portion of each of the multiple slots has a closed wall configuration; and
the closed wall configuration of each of the multiple slots includes a "V" shape.

10. The fastener assembly of claim 1, further includes a frangible pintail, which extends from the head.

11. The fastener assembly of claim 10, wherein the central axis of the bolt and a central axis of the frangible pintail are collinear, and wherein an interface of the frangible pintail and the head includes a smaller diameter than a diameter of the frangible pintail.

12. The fastener assembly of claim 10, wherein the frangible pintail defines pintail threads.

13. The fastener assembly of claim 8, wherein the second portion extends circumferentially about the shank.

14. The fastener assembly of claim 13, wherein:
the first end portion of each of the multiple slots is in communication with the channel when the bolt is positioned inside of the sleeve; and
the second end portion of each of the multiple slots has a closed wall configuration.

15. The fastener assembly of claim 14, wherein the closed wall configuration includes one of a "U" shape or an open rectangular shape.

16. A method for installing a fastener assembly, the method comprising:
positioning a bolt, having a head and a shank, into a sleeve, wherein:
the shank defines threads;
the bolt defines a channel which extends circumferentially about the bolt;
the head defines multiple head channels,
each of the multiple head channels has a first end in communication with the channel and a second end in communication with an outside of the head positioned at a top surface of the head; and
the sleeve including an outer surface and an inner surface opposing the outer surface, and wherein the inner surface has threads engaging the threads of the bolt when the bolt is positioned inside of the sleeve, wherein:
the sleeve includes a first portion and a second portion extending from the first portion;
a portion of the sleeve formed of an annealed material to define an annealed portion;
multiple slots are defined through the sleeve, and the annealed portion of the sleeve is disposed between the multiple slots and the threads of the sleeve, and each of the multiple slots is positioned in communication with the channel of the bolt when the bolt is positioned inside of the sleeve; and
each of the multiple slots extend in a curvilinear direction along the second portion of the sleeve between a first end portion and a second end portion of each respective ones of the multiple slots, wherein the first end portion of each of the multiple slots is disposed proximal to the first portion of the sleeve and the second end portion of each of the respective multiple slots is disposed proximal to the annealed portion of the sleeve, wherein the second end portion of each of the multiple slots is disposed forward of the corresponding first end portion of respective ones of the multiple slots relative to a clockwise direction around a central axis when viewing the sleeve from a top plan orientation; and
rotating the bolt clockwise relative to the central axis which applies a torque to the sleeve, and a configuration of the multiple slots is maintained when the torque is applied to the sleeve.

17. The method of claim 16, further including engaging the threads of the bolt with the threads of the sleeve, wherein the threads of the sleeve are positioned farther from the head of the bolt than the annealed portion of the sleeve.

18. The method of claim 17, further including inserting the bolt and the sleeve into a hole defined by layered structures to be secured by the fastener assembly.

19. The method of claim 18, further including pulling the bolt in a direction away from the hole while the sleeve is held within the hole, causing the annealed portion of the sleeve to buckle.

20. The method of claim 19, further including turning the bolt such that the threads of the bolt engage the threads of the sleeve positioned farther away from the annealed portion of the sleeve with respect to the head of the bolt and applying a compression force on the layered structures which define the hole.

\* \* \* \* \*